Nov. 12, 1929.　　　R. PENNER　　　1,735,088

SAFETY IRON HOLDER

Filed March 14, 1927

Inventor

Rudolph Penner,

By

Attorneys

Patented Nov. 12, 1929

1,735,088

UNITED STATES PATENT OFFICE

RUDOLPH PENNER, OF DETROIT, MICHIGAN

SAFETY IRON HOLDER

Application filed March 14, 1927. Serial No. 175,017.

The present invention pertains to a novel holder or stand for an electric iron and equipped with a thermostatic switch controlling current flowing to the iron.

The usual thermostatic control of an electric iron consists of a thermostatic switch carried by the iron itself. Such a switch will open at a predetermined temperature even though the iron be in the hands of the user at the time. It is not generally desired to cut off the current while the iron is actually in use, since a hot iron is usually desired except when resting on the stand. Fires and burns in connection with electric irons occur most frequently when the iron rests on the stand in an idle condition with the current turned on.

The principal object of the invention is to provide a thermostatic control which operates in accordance with the more desirable conditions mentioned above. The invention comprises briefly, the provision of a thermostatic switch associated with the stand rather than carried by the iron. The thermostatic element of this switch is mounted in such a manner that it is under the influence of the temperature of the iron which rests on the stand. This thermostat is connected directly to the flat iron, so that it controls the supply of current thereto. It will be apparent therefore that no thermostatic control of the iron is exercised while the iron is in actual use, since the thermostatic element governing the control switch is supported by the stand.

The invention is fully disclosed in the following description and in the accompanying drawings in which Figure 1 is a plan view of the electric iron stand;

Reference to these views will now be made by use of like characters which are employed to designate corresponding parts throughout.

Figure 1:
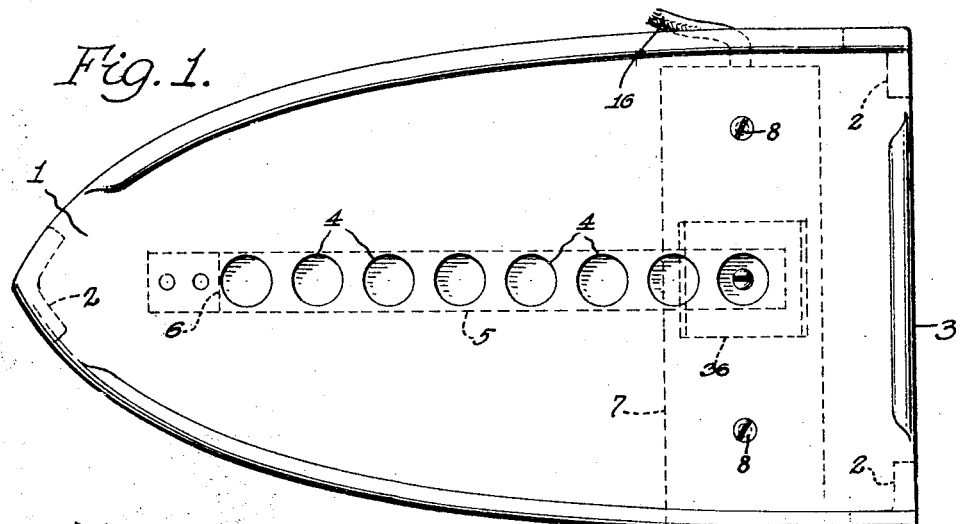
Figure 2:
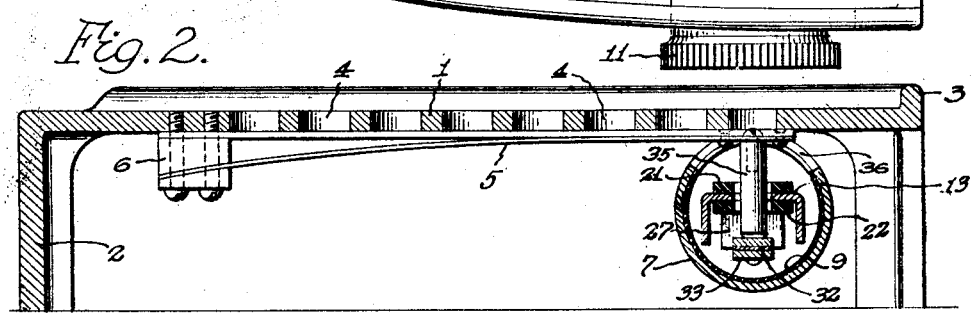
Fig. 2 is a longitudinal section thereof, showing also the thermostatic switch carried thereby.

The flat iron stand or base which is shown more clearly in Figs. 1 and 2 comprises a three-cornered plate 1 having integral legs 2 at the corners thereof and equipped with marginal ribs 3 in the usual manner. The plate 1 is also formed with an axial series of apertures 4, and beneath this line of apertures is mounted a bi-metallic thermostatic element 5 anchored to the base by a suitable clamp 6.

Figure 3:
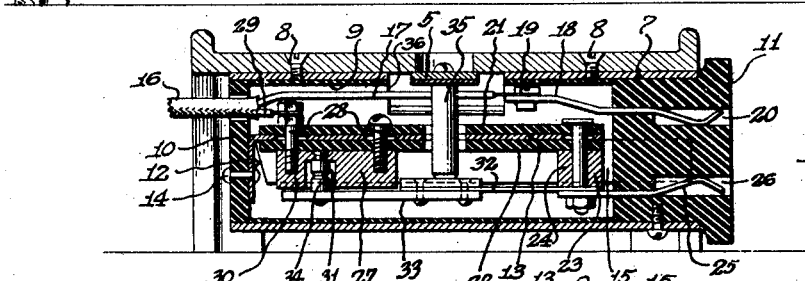
Fig. 3 is a transverse section of the stand and switch.
Figure 4:
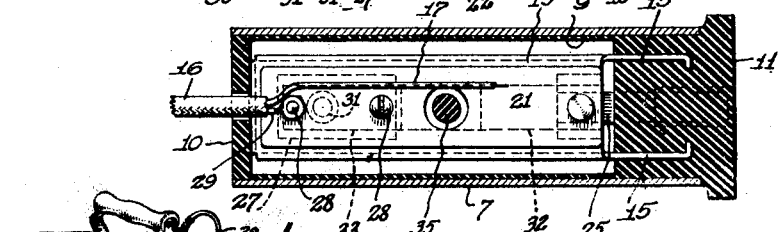
Fig. 4 is a longitudinal section of the switch at right angles to Fig. 3.

The thermostatic element may be considered as part of a thermostatic switch enclosed in a metallic tube 7 secured to the bottom of the plate 1 and transversely thereof by means of screws 8. The tube is lined with an insulated sleeve 9 and is closed at one end by a disk 10 and at the other end by a socket member 11 both of insulating material. An inverted trough shaped member having a rearward flange 12 is mounted between the members 10 and 11 in such a manner that the base 13 thereof lies in a horizontal plane. The trough is supported in this position by having a pin 14 securing the flange to the member 10. The sides of the trough are prolonged as at 15, beyond the base 13 and are firmly secured in the socket member 11 as clearly shown in Fig. 4. A current conductor 16 is passed through the disk 10 and has one of the lines 17 thereof secured to a spring contact blade 18 by means of a screw 19. This blade passes through the base of the socket member 12 and rests in a slot 20 thereof as shown in Fig. 3.

Insulating sheets 21 and 22 are provided at both sides of the base 13 and are secured thereto by attaching members presently to be mentioned.

The end of the base nearer the member 11 is provided on its lower surface with a supporting block 23 fixed thereto by a pin 24 passed through both of these parts. The pin also secures to the block another spring contact 25 which passes partly through the member 11 and lies in a slot 26 formed in the latter. At the opposite end of the base and at the lower surface thereof is provided a magnetized switch block 27 secured to the base by means of screws 28 which also pass through and retain the insulating layers 21 and 22. One of these screws 28 serves as a binding post for the remaining lead 29 as shown in Fig. 3. The block is formed in its lower surface with a cavity 30 in which is fitted a tungsten contact point 31. The pin 24 also secures one end of a spring blade 32 having an armature 33 for the magnetized block connected to the other end thereof. The armature carries another tungsten contact point adapted to enter the recess 30 and engage the member 31. The relation of the two contact points to the depth of the recess is such that when the points are in engagement a narrow space remains between the magnet and armature.

To the free end of the thermostatic element 5 is attached a stud 36 which enters the tube 7 and passes freely through the parts 13, 21 and 22 and into engagement with the switch blade at the point of juncture between the parts 32 and 33. The slot 36 in the top of the sleeve 7 through which the stud passes is of sufficient width to permit a significant vertical movement of the free end of the thermostatic element therein.

Figure 5:
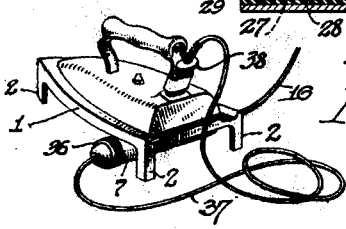
Fig. 5 is a perspective view of a flat iron mounted upon the stand, showing the manner in which the iron is connected to the thermostatic switch.

The slots 20 and 26 in the slot 11 are adapted to receive the usual prongs of an electrical plug 36. From this plug a conductor 37 is extended to the usual flatiron plug 38. Current is supplied to the switch through the conductor 60 as shown in Fig. 5.

In the normal operation of the device, the spring action of the member 32 holds the tungsten contact points 31 and 34 into engagement whereby current readily flows from the conductor through the switch and to the electric iron. When the thermostatic element 5 attains a predetermined temperature due to the electric iron mounted on the stand, the member 5 will bend and move the stud 35 downwardly. The switch blade will be depressed, whereby contact between the points 31 and 34 will be broken and the switch will remain in this open condition until the member 5 moves sufficiently to withdraw the stud 35 and permit reengagement between the points 31 and 34. In order to permit a rapid closing of the circuit and to prevent arcing when the contact points are close together, the block 27 is magnetized to sharply attract the armature at this time and close the circuit before arcing occurs. The above mentioned relation between the contact points and the cavity 30 providing a narrow space between the block 27 and armature 33, avoids sticking of the armature to the block so that the switch blade will respond promptly to the downward movement of the stud 35. Thus, the desired advantages of the magnetic switch are obtained, but the undesirable sticking between the parts thereof is avoided.

Although a specific embodiment of the invention has been illustrated and described it will be understood that limitations in the details of construction may be made without departing from the scope of the invention as indicated by the appended claim.

What I claim is:—

A switch comprising a magnetized block, a conductor connected thereto, a fixed support, a spring switch blade fixed to said support and adapted for attraction by said block, contact points carried by said block and blade and adapted for mutual engagement, a thermostatic element having one end fixedly supported, an operative connection between said element and said switch blade, an insulation socket member mounted adjacent said fixed support and having a pair of slots, another conductor adapted to cooperate with said first named conductor in forming a circuit, and a pair of spring contacts extending from said last named conductor and switch blade respectively into said slots.

In testimony whereof I affix my signature.

RUDOLPH PENNER.